United States Patent [19]

Krishna et al.

[11] Patent Number: 6,094,439
[45] Date of Patent: Jul. 25, 2000

[54] ARRANGEMENT FOR TRANSMITTING HIGH SPEED PACKET DATA FROM A MEDIA ACCESS CONTROLLER ACROSS MULTIPLE PHYSICAL LINKS

[75] Inventors: Gopal S. Krishna, San Jose; Mohan V. Kalkunte; Shashank C. Merchant, both of Sunnyvale, all of Calif.

[73] Assignee: Advanced Micro Devices, Inc., Sunnyvale, Calif.

[21] Appl. No.: 08/912,235

[22] Filed: Aug. 15, 1997

[51] Int. Cl.[7] .................................................. H04L 12/413
[52] U.S. Cl. ........................... 370/445; 370/463; 370/473
[58] Field of Search .................................. 370/445, 446, 370/465, 466, 468, 469, 471, 473, 474, 463

[56] References Cited

U.S. PATENT DOCUMENTS

| | | | |
|---|---|---|---|
| 5,461,621 | 10/1995 | Little | 370/470 |
| 5,485,456 | 1/1996 | Shtayer et al. | 370/395 |
| 5,680,400 | 10/1997 | York | 370/473 |
| 5,802,054 | 9/1998 | Bellenger | 370/401 |
| 5,892,926 | 4/1999 | Witkowski et al. | 395/280 |

*Primary Examiner*—Chau Nguyen
*Assistant Examiner*—Soon-Dong Hyun

[57] ABSTRACT

A Gigabit network node having a media access controller outputting packet data at Gigabit rates uses multiple 100 MB/s physical layer links coupled to a physical interface having a data router to enable implementation of a Gigabit network using low cost data links. A modified reconciliation layer, also referred to as a multi-Media Independent Interface (m-MII) selectively transmits at least a portion of the packet data from the MAC onto the plurality of physical layer links. The physical m-MII interface may output separate packet data on separate physical layer links to increase the effective data transmission rate, may output the same packet data on multiple transmission paths to improve quality of service by establishing redundant data links, or any combination thereof. Priority channels may also be provided on selected physical layer links to provide quality of service and cost of service options within an Ethernet work group environment.

11 Claims, 4 Drawing Sheets

ARRANGEMENT FOR TRANSMITTING HIGH SPEED PACKET DATA FROM A MEDIA ACCESS CONTROLLER ACROSS MULTIPLE PHYSICAL LINKS

TECHNICAL FIELD

The present invention relates to transmitting packet data on a high speed network, more specifically to methods and systems for transmitting data from a media access controller (MAC) layer onto a physical layer of a half-duplex or full-duplex network operating at data rates of one Gigabit per second and two Gigabit per second, respectively.

BACKGROUND ART

Local area networks use a network cable or other media to link stations on the network. Each local area network architecture uses a media access control (MAC) that sends data packets to a physical layer transceiver for transmission on the network media.

The Ethernet protocol ISO/IEC 8802-3 (ANSI/IEEE standard 802.3, 1993 edition) defines a half-duplex media access mechanism that permits all stations to access the network channel with equality. The half-duplex mechanism typically operates at either 10 MB/s, or 100 MB/s. A full-duplex environment has also been proposed for Ethernet networks, referred to as IEEE 802.3x, Full-Duplex with Flow Control - Working Draft (0.3). The full-duplex environment provides a two-way, point-to-point communication link between two networks stations using the switched hub, for example at 100 MB/s, so that two stations can simultaneously transmit and receive Ethernet data packets between each other without collision.

The IEEE 802.3z Task Force is currently defining standards for the operation of a shared (i.e., half-duplex) and full-duplex Gigabit Ethernet. The standard will describe a media access control (MAC) layer, a reconciliation layer, a Gigabit-media independent interface (GMII), and physical media dependent sublayers that will implement the physical layer (PHY) of the proposed networks. The proposed networks will enable users to implement Ethernet links capable of operating at a data rate of 1 Gigabit per second in half-duplex mode and 2 Gigabits per second in full-duplex mode.

Currently, the Fast Ethernet standard describes a media independent interface (MII) that is used to connect Fast Ethernet MAC layer devices to the Fast Ethernet devices, enabling users to implement Ethernet links operating at 100 MB/s half-duplex, and 200 MB/s full-duplex.

There currently is no means for users to implement Ethernet links that operate in the range of data rates that exceed 200 MB/s and are lower than 1 Gigabit per second. In addition, efforts at implementing a physical data link at Gigabit transmission rates is very expensive, since the current state of technology does not permit use of copper links for Gigabit data rate transmissions. Hence, only fiber optics can be used to transmit data at Gigabit data rates.

SUMMARY OF THE INVENTION

There is a need for an arrangement for implementing physical layer data links that provide Gigabit transmission rates in a cost effective manner.

There is also a need for an arrangement for enabling rapid implementation of Gigabit rate Ethernet networks without the necessity of optical fibers as physical links. In addition, there is a need for an arrangement permitting future upgrading to optical fiber links without software modification.

There is also a need for an arrangement that enables the implementation of priority channels to provide quality of service and cost of service options within an Ethernet network group environment, where multiple physical links can be used in parallel.

There is also a need for a scaleable Ethernet link with speeds that can scale from 100 MB/s to Gigabit data rates in a manner that is transparent to the user's application, system and device drivers, enabling a user to seamlessly migrate to full Gigabit speeds.

These and other needs are attained by the present invention, where a modified reconciliation layer between the media access controller and the physical layer selectively transmits at least a portion of the packet data from the media access controller onto at least one of a plurality of physical layer links.

According to one aspect of the present invention, a method of transmitting packet data output from a media access controller comprises establishing a plurality of physical layer links configured for transmitting serial data to a destination network node, receiving the packet data from the media access controller by a physical interface coupled to the physical layer links, and selectively transmitting at least a portion of the packet data from the physical interface onto at least a first of the physical layer links. Use of multiple physical layer links provides higher data transmission rates by selectively transmitting different data segments on respective physical layer links. The selective transmission also provides improved quality of service by selectively transmitting the same data on redundant links. Hence, different portions of the packet data can be transmitted on respective physical layer links to increase the effective transmission rate, for example up to Gigabit speeds using 100 MB/s links.

Another aspect of the present invention provides an apparatus for transmitting packet data output from a media access controller, comprising an input configured for receiving the packet data at a first transmission rate, and a data router configured for selectively transmitting at least a portion of the received packet data to at least one of a plurality of physical layer devices at a second transmission rate less than the first transmission rate. The data router selectively transmits at least a portion of the received packet data to at least one of the physical layer devices at a second transmission rate less than the first transmission rate, enabling implementation of a high speed data network transmitting data at the higher first transmission rate using multiple physical links transmitting at the lower second transmission rate. In addition, selective transmission to the plurality of physical layer devices provides a greater quality of service by minimizing data loss in the event one of the physical layer links for a corresponding physical layer device encounters a failure.

Still another aspect of the present invention provides a monolithic integrated circuit comprising a media access controller configured for outputting packet data at a first transmission rate, a plurality of physical layer devices configured for outputting data onto respective physical layer links at a second transmission rate, the second transmission rate less than the first transmission rate and related to the first transmission rate and a number of the outputs, and a data router configured for selectively transmitting at least a portion of the packet data from the media access controller to at least one of the physical layer devices at the second transmission rate. The integrated circuit includes both a high speed media access controller and multiple physical layer devices, enabling a user to easily implement a high speed data network merely by coupling conventional network media cables operable at the lower second transmission rate (e.g., 100 MB/s) to the physical layer devices to obtain the higher first transmission rate (e.g., 1 GB/s).

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment enables a media implementation of Gigabit networks using multiple 100 MB PHY technology. Since 100 MB PHY technology is readily available and cost effective, the 100 MB links provide an inexpensive and transparent solution for applications needing higher bandwidth and quality of service options. Moreover, the scaleable link is transparent to the user's application, system and device drivers, enabling a user to seamlessly migrate to full Gigabit speeds by simply replacing the disclosed physical layer with a Gigabit compliant implementation, once available in the technology.

The disclosed arrangements are directed to implementation of an Ethernet link having scaleable speeds from 100 MB/s to Gigabit rates in 100 MB steps, using existing 100 MB physical layer (PHY) technology. The disclosed embodiment receives packet data from a Gigabit MAC, and selectively routes the received packet data to multiple physical layer devices operating at 100 MB/s. Use of multiple links enables parallel transmissions of different packet data, to increase the effective data rate, for example using ten (10) 100 MB/s physical links to produce one virtual GB/s link. The use of multiple links in parallel also enables the implementation of priority channels to provide quality of service and cost of service options within an Ethernet network group environment, which can be further extended to work with intervening network schemes that provide similar options across wide area networks (WAN).

Figure 1:
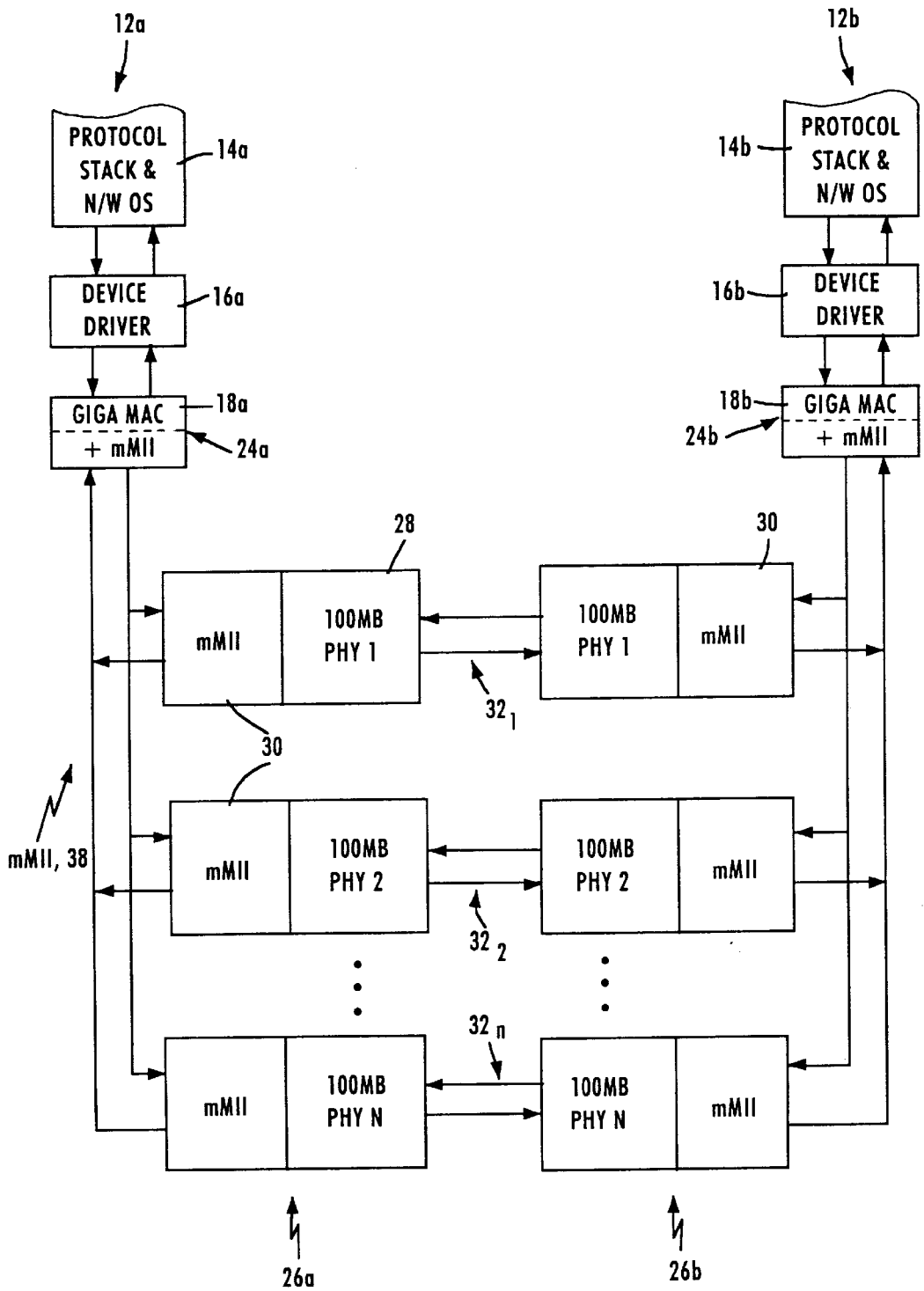
FIG. 1 is a block diagram illustrating an arrangement for transmitting packet data across a high speed data network according to an embodiment of the present invention.

FIG. 1 is a block diagram illustrating the use of multiple layer links in order to provide Gigabit transmission rates using 100 MB/s data links according to an embodiment of the present invention. As shown in FIG. 1, each network node 12 includes a protocol layer 14, a device driver 16, and a media access controller (MAC) layer 24 having a Gigabit MAC core 18 compliant with the Gigabit Ethernet standards proposed by the IEEE 802.3z Working Group. The network node 12 also includes a special reconciliation layer, referred to as the multi-Media Independent Interface (m-MII 38), which interfaces with the MAC 24 and provides service functions required to distribute, multiplex, demultiplex, and aggregate traffic to and from multiple 100 MB physical layer (PHY) devices 26 having 100 MB physical layer transceivers 28. As shown in FIG. 1, the functionality of the special reconciliation layer (m-MII) can be distributed between the MAC operations in the MAC 24 and the operations within the 100 MB physical layer devices. Hence, the MAC 24 of FIG. 1 includes a portion of multi-MII operations, described below and each of the 100 MB physical layer devices 26 of FIG. 1 includes a 100 MB physical layer transceiver 28 and a multi-MII module 30 that performs service functions complementary to the m-MII functionality in the MAC 24a.

The MAC 24 generates a data packet, also referred to as a data frame, according to IEEE 802.3 protocol. Once the 802.3 data packet has been generated, the m-MII functionality in the MAC 24 selectively transmits at least a portion of the data packet to at least one of the physical layer devices 26. The data packet output to a selected physical layer device 26 may be an entire 802.3 data packet, or alternatively a segment of the data packet. The m-MII portion of the MAC 24a may be configured to either send a data packet to the different physical layer devices 26 on a packet-by-packet basis (e.g., packet 1 to PHY1, packet 2 to PHY2, etc.), or alternatively may be configured to divide the data packet into a group of separate data segments, and transmit the group of separate data segments to the respective physical layer devices 26. If the MAC 24 outputs the portion of the data packet as a data segment to the selected physical layer device 26, the m-MII 30 within the physical layer device 26 will perform additional signaling prior to sending the data segment on the corresponding physical layer link 32, for example by generating a separate preamble, or by appending an error code such as a cyclic redundancy check (CRC) code at the end of the data segment. The m-MII portion of the MAC 24 may also be configured to simultaneously output the same packet data to multiple physical layer devices 26 for guaranteed quality of service across redundant data links.

The physical layer device 28 is a conventional 100 MB physical layer device configured for transmitting and receiving serial data on the 100 MB/s network media 32. As recognized in the art, the media 32 may operate in either half-duplex or full-duplex mode.

Hence, the m-MII 38 in each corresponding node 12a and 12b enables the MAC layers 24a and 24b to send and receive data packets across multiple physical layer links 32. The m-MII 38 can be used for different applications, for example, increasing the effective data transmission rate by sending different data packets (or portions thereof) on two or more links 32. Another exemplary application reserves a link (e.g., link $32_2$) for use in the event that a currently-used link (e.g., link $32_1$) encounters a link failure, maintaining quality of service by ensuring the data link failure does not halt data packet transmission. Still another exemplary application maintains the highest quality of service by using two dedicated links 32 for simultaneous transmission of the same packet data. Additional signaling and control logic may be implemented for these and other m-MII applications across the multiple links 32.

Figure 2:
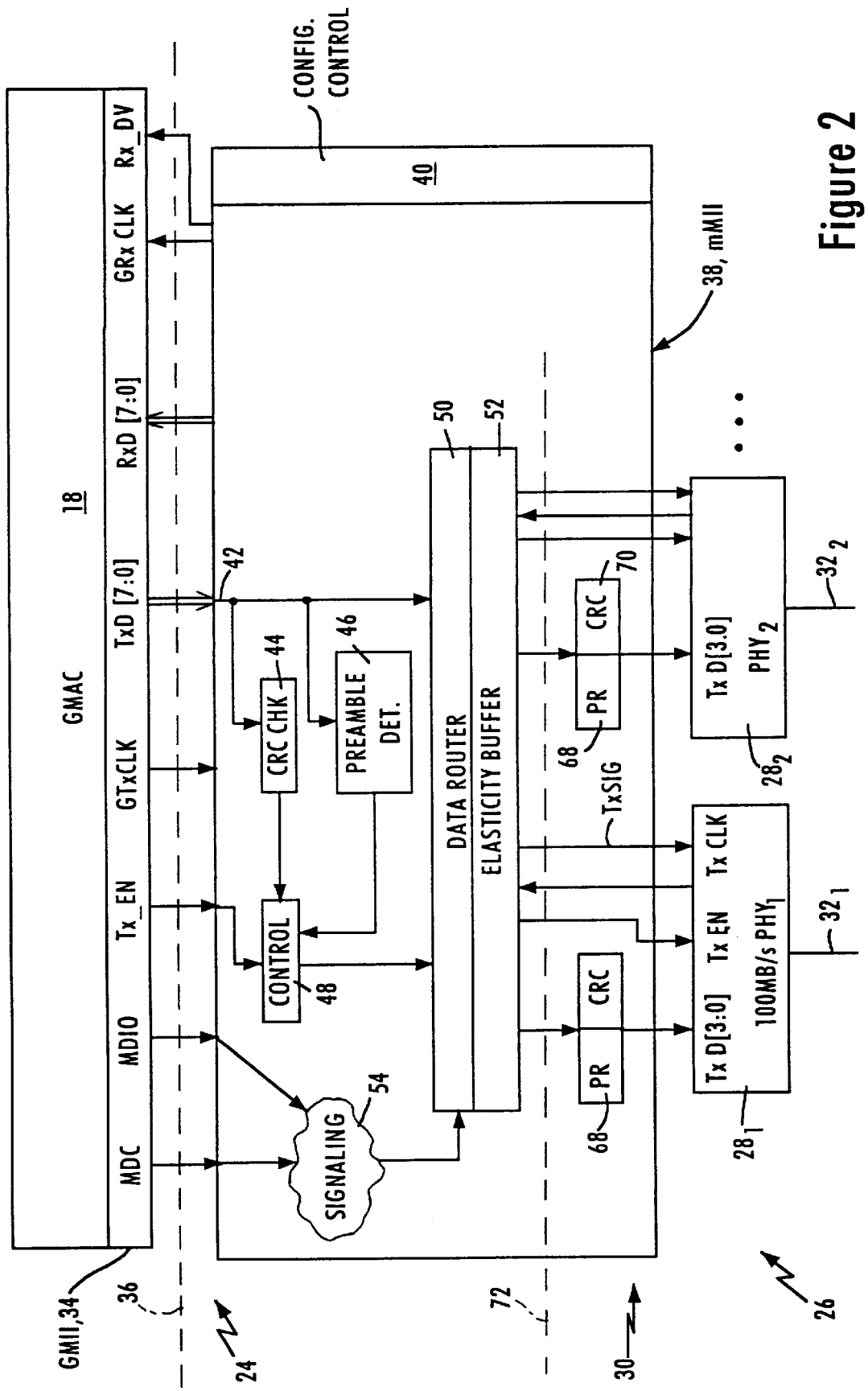
FIG. 2 is a block diagram illustrating in detail the reconciliation layer serving as a physical interface between the MAC layer and the physical transceivers (PHY) of FIG. 1.

FIG. 2 is a block diagram illustrating in detail the operations of the MAC 24 in relation to the reconciliation layer function in the physical m-MII interface and the physical layer devices according to nibble level multiplexing and demultiplexing. Specifically, the arrangement of FIG. 2 is particularly directed to divide received packet data from the Gigabit MAC core 18. As shown in FIG. 2, the MAC 24 includes a Gigabit MAC core 18 media independent interface (GMII) that sends and receives data packets to and from the physical layer designated by the region below dotted line 36. Although FIG. 2 discloses only signals associated with transmitting a data packet to the physical layer, it is recognized that the physical layer also sends to the Gigabit MAC core 18 packet data that has been received from the physical layer links 32. The GMII 34 outputs a data packet compliant with IEEE 802.3 to a physical m-MII interface 38 along an 8-bit transmit data (TxD) signal path. The GMII 34 also outputs a 125 MHz transmit clock (GTxCLK), a data framing signal (Tx_EN) indicating the presence of valid frame data. The GMII 34 also outputs management data signals including management data input output (MDIO) signals and a management data clock (MDC).

The disclosed arrangement includes a physical m-MII interface 38 coupled to the physical layer links 32 via the respective physical layer transceivers 28. The physical m-MII interface is configured to divide the received packet data from the Gigabit MAC core 18 into a group of separate data segments based on configuration control settings set by a user in a configuration control portion 40. The physical m-MII interface 38 may be implemented as a discrete component separate from the Gigabit MAC core 18 and the physical transceiver devices 28, or as part of an integrated monolithic circuit including the Gigabit MAC core 18, the physical m-MII interface 38, and the physical transceivers 28, described in detail with respect to FIGS. 3A, 3B, and 3C, respectively. Hence, the configuration control 40 may be implemented as dual inline packet (DIP) switches if the physical m-MII interface 38 is a discrete component. Alternatively, the configuration control 40 may be implemented as embedded microcode if the physical m-MII interface 38 is implemented as an integrated portion of a monolithic integrated circuit.

The physical m-MII interface 38 and input data path 42 configured for receiving the packet data from the Gigabit MAC core 18 along the 8-bit transmit data (TxD) signal path at the Gigabit transmission rate. The physical m-MII interface 38 also includes a CRC checker 44, a preamble detector 46, and a control portion 48 for controlling overall operations of the physical m-MII interface 38. The preamble detector 46 detects the preamble of the data packet according to IEEE 802.3 protocol, and sends a signal to the control portion 48 indicating detection of the preamble, indicating the control portion 48 to identify the beginning of a data packet from the Gigabit MAC 18. The CRC checker 44 detects the presence of an error in the transmitted data frame from the Gigabit MAC 18 by comparing the received data with the error code appended at the end of the 802.3 frame, and outputting a signal to the control unit 48 upon detection of an error.

The data router 50 includes a data packet splitter configured for splitting packet data into a plurality of data segments. The data router 50 thus demultiplexes the received packet data from the input path 42 into a group of separate data segments under the control of control unit 48 and the configuration control unit 40. Specifically, the packet data received from the GMII 34 is split into multiple outgoing streams, corresponding to the number of 100 MB PHYs implemented, at the nibble level. A nibble is defined as four bits, i.e., one-half of a byte. Therefore, "N" nibbles of a packet arriving at the Gigabit MAC core 18 will be transmitted on PHY1 28, the next N nibbles on PHY2, etc. The physical m-MII interface 38 also includes a signaling generator 54 that enables the proper assembly of the data nibbles into the corresponding MAC packet at the arriving node. The data router 50 can either output different segments on respective physical layer links to increase the overall transmission rate, or output the same segments on multiple paths to provide higher quality of service using redundant links.

Figure 4:
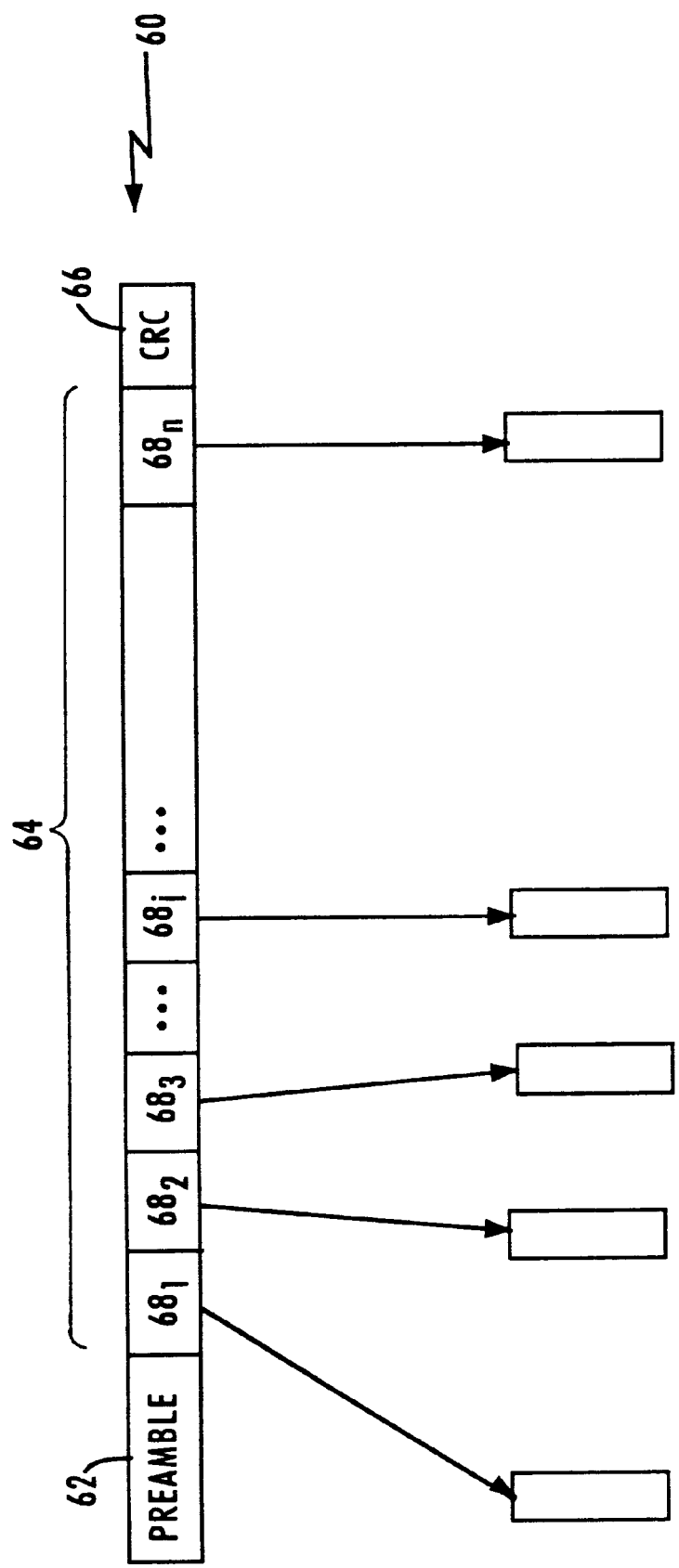
FIG. 4 is a diagram illustrating the splitting of packet data for transmission on parallel physical layer links.

Hence, the data router 50 can be configured to demultiplex the incoming data packet from the GMII 34 into a plurality of data segments, where the data router 50 splits the received packet data based on a corresponding number (N) of nibbles. FIG. 4 illustrates the demultiplexing by the data router 50. As shown in FIG. 4, a data packet generated by the GMII 34 according to IEEE 802.3 protocol includes a preamble 62, a data portion 64 including the packet header and payload, and a frame check sequence field 66, for example a cyclic redundancy check (CRC) code. The data router 50 divides the received packet data into a group of separate data segments 68, and outputs the data segments for transmission by the corresponding physical layer transceiver 28. For example, assume that the data router divides the data packet based on N nibbles, where N=1. In this case, the first four bits of the header are output for transmission onto 100 MB data link $32_1$. The next nibble is output for transmission to data link $32_2$, etc. If all the 100 MB data links are used to transmit separate data segments, the data router 50 will supply different data segments to the respective physical layer transceivers 28 in a prescribed order, for example a round-robin fashion. Alternatively, the data router 50 may be configured to provide parallel transmissions, for example where data links $32_1$ through $32_5$ are used as one data link, and data links $32_6$ through $32_{10}$ are used for a second redundant link. In this configuration, the physical m-MII interface 38 provides high quality of service by providing two redundant data paths for sending and receiving serial data. Alternatively, different combinations may be used to provide, for example, three virtual links, where the first and second virtual links transmit the same data.

The arrangement of FIG. 2 has the particular advantage of requiring minimal buffering within the physical m-MII interface layer 38, and that the packet latency (e.g., the time from when packet data arrives at the Gigabit MAC 18 to when the first bytes of data are transmitted on the physical layer link 32) is low. The physical m-MII interface 38 also includes an elasticity buffer 52 that matches the different transmission rates between the Gigabit transmission rate of the Gigabit MAC core 18 and GMII 34, and the multiple 100 Mb links 32. The elasticity buffer 52 is preferably implemented as a 4-bit wide FIFO for each 100 Mb port, where demultiplexing is performed by the data router 50.

As described above, the data router 50 is configured for selectively transmitting at least a portion of the received packet data to at least one of the plurality of physical layer devices 28 at a transmission rate less than the Gigabit transmission rate of the GMII 34. Since the data packet is divided into separate data segments by the data router, the information in frame check sequence 66 is no longer valid. Hence, the physical m-MII interface layer 38 also includes a preamble generator 68 and a CRC generator 70. The preamble generator 68 generates a new preamble for the corresponding data segment, which is output to the physical transceiver 28 as a 4-bit transmit data signal (TxD). The CRC generator 70 generates a new frame check sequence for the data segment output by the data router. The new frame check sequence can be used by the receiver node 12b to detect a failure in the link. As described above, the data segment may be temporarily stored in the elasticity buffer 52 before output to the physical transceiver 28. The data router also will output a framing control signal (TxEN) and a signaling control signal (TxSIG) for use at the destination physical m-MII interface layer in reassembling the data packet.

As described above, one arrangement for transmitting packet data in a Gigabit network is by dividing packet data into a group of separate data segments, and transmitting the group of separate data segments on the respective physical layer links. An alternative approach is to transmit a first data packet on the first physical layer link, and transmitting a second data packet received from the Gigabit MAC core 18 on a second physical layer link. Hence, a messaging scheme between the physical m-MII interfaces 38 will enable the interfaces to send and receive data packets on respective data links 32, where a data router 50 is configured to output the packet data to the selected physical layer devices 28 on a packet-by-packet basis.

In this scheme, the arriving MAC level data is split into multiple streams, corresponding to the number of 100 MBit PHYs, on packet boundaries. Thus, in the simplest of cases, Packet (N) arriving at the MAC is sent out on PHY1, Packet (N+1) is sent out on PHY2, and so on. A messaging scheme is then used between the m-MII layers on the sending and receiving nodes to reorder the packets at the receiving node.

One arrangement by the physical m-MII layer 38 involves outputting arriving packets on a least recently used PHY link. At the beginning, an unused PHY link is selected each time a packet arrives at the Gigabit MAC core 18. After all the links have been used at least once, the least recently used link is chosen when a new packet arrives at the MAC. It should be noted that this can result in a "round-robin" scheme if an order is implied in the initial selection of the PHYs, and packet traffic is continuous.

Another arrangement by the physical m-MII layer 38 involved a weighted (prioritized) load distribution. A subset of the PHY links are identified as high priority links. This configuration is agreed upon between the sending and receiving nodes through a special messaging scheme. When a packet arrives at the sending MAC, its priority is determined, based on Standard schemes (802.1p) or other schemes. If the packet is deemed a high priority, then it is sent to the high priority link. Otherwise, it is sent to the normal link as per the simple load distribution algorithm.

The priority level of the incoming packet can be determined by a tag associated with the packet, the packet's VLAN identifier a decode of its internal data, or some other yet to be identified scheme.

Hence, the disclosed embodiment enables transmission of packet data on multiple 100 MBit links in order to implement Gigabit-rate data links using conventional 100 MBit physical layer devices. In addition, the physical m-MII interface 38 can be configured to detect a fault in one of the links 32 and/or the associated transceiver 28, and to reroute traffic accordingly. Hence the routing functionality within the physical m-MII interface 38 can be configured to reroute packet data in response to a detected transmission condition on one of the links.

Figure 3A:
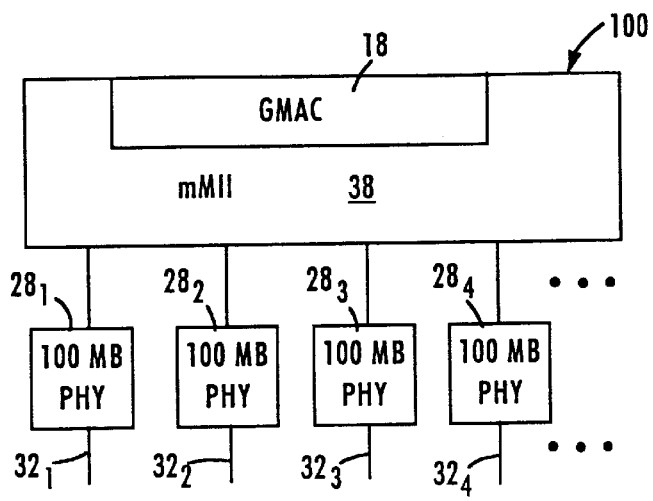
FIGS. 3A, 3B and 3C are diagrams illustrating alternative implementations of FIG. 2.
Figure 3B:
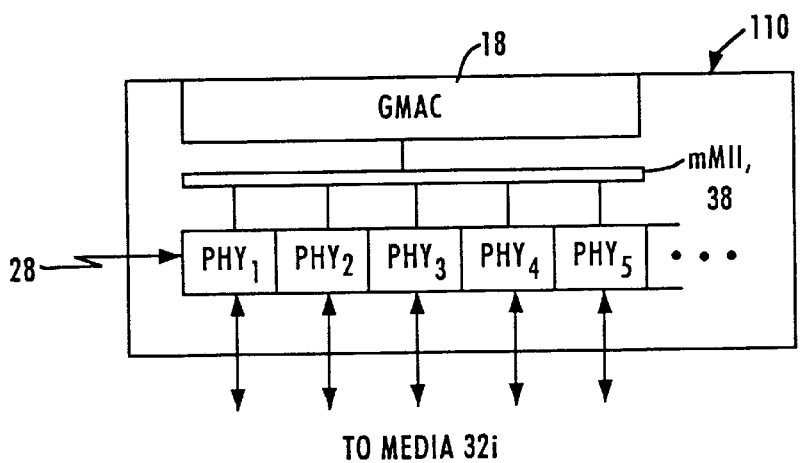
Figure 3C:
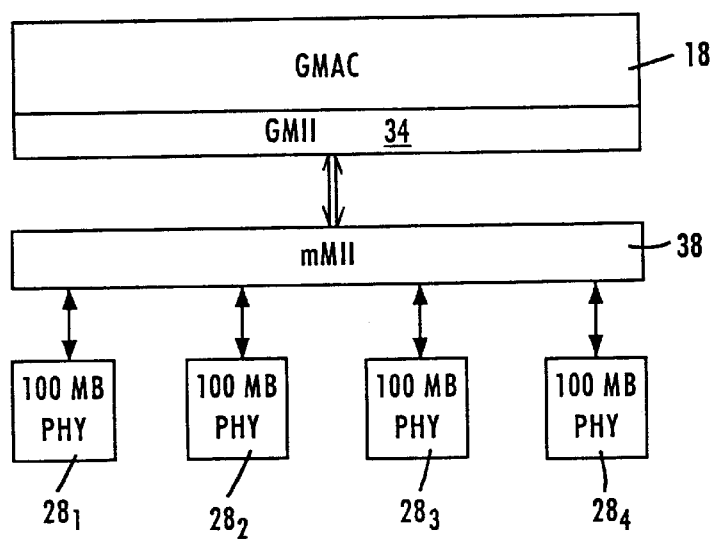

FIGS. 3A, 3B, and 3C are alternative implementations for the Gigabit MAC, the physical m-MII interface, and the physical transceivers. As shown in FIG. 3A, the functionality of the Gigabit MAC 18 and the physical m-MII interface 38 are integrated onto a monolithic integrated circuit 100, where the integrated circuit 100 outputs the packet data on multiple physical layer paths 32 via the respective physical layer transceivers 28.

FIG. 3B discloses an alternative implementation, where a monolithic integrated circuit 110 provides a completely integrated system including the Gigabit MAC 18, the physical m-MII interface 38, and the physical layer transceivers 28 integrated onto a single monolithic integrated circuit 110. This implementation provides the maximum convenience for an end user, since a user can implement the system by connecting 100 MB media cables to the monolithic integrated circuit 110 using a relatively simple hardware connector.

FIG. 3C provides still another alternative implementation, where the Gigabit MAC 18, the physical m-MII interface 38, and each of the physical layer transceivers 28 are implemented as discrete components. Although the arrangement of FIG. 3C may be more complex for the end user during initial set-up, the arrangement of FIG. 3C enables an end user to upgrade at a future time to newly developed Gigabit data links without software modifications.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

We claim:

1. The method of transmitting packet data output from a media access controller at first transmission rate, comprising:

establishing a plurality of physical layer links configured for transmitting serial data to a destination network node;

receiving the packet data from the media access controller by a physical interface coupled to the physical layer links, the received packet data having a preamble and an error code; and selectively transmitting at least a portion of the packet data from the physical interface onto at least a first of the physical layer links at a second, slower transmission rate, wherein the selectively transmitting step comprises:
dividing the received packet data into a group of separate data segments, and
transmitting the group of separate data segments on a group of the physical layer links, respectively, each separate data segment having a separate preamble before each separate data segment and error code, different from the preamble and error code of the received packet data, and the dividing step comprises:
splitting the received packet data based on a prescribed number of bits.

2. The method of claim 1, wherein the dividing step further comprises determining the prescribed number bits based on a corresponding prescribed number of nibbles.

3. The method of transmitting packet data output from a media access controller at first transmission rate, comprising:

establishing a plurality of physical layer links configured for transmitting serial data to a destination network node;

receiving the packet data from the media access controller by a physical interface coupled to the physical layer links, the received packet data having a preamble and an error code; and selectively transmitting at least a portion of the packet data from the physical interface onto at least a first of the physical layer links at a second, slower transmission rate, wherein the selectively transmitting step comprises:

dividing the received packet data into a group of separate data segments, and transmitting the group of separate data segments on a group of the physical layer links, respectively, each separate data segment having a separate preamble before each separate data segment and error code, different from the preamble and error code of the received packet data, and the selectively transmitting step comprises:

determining a presence of an error in the received packet data.

4. The method of claim 3, wherein the determining step comprises detecting an error correction field within the received packet data.

5. The method of claim 4, wherein receiving step comprises receiving the packet data for a data packet, the detecting step comprising reading an error correction field at an end of the data packet.

6. The method of transmitting packet data output from a media access controller at first transmission rate, comprising:

establishing a plurality of physical layer links configured for transmitting serial data to a destination network node;

receiving the packet data from the media access controller by a physical interface coupled to the physical layer links, the received packet data having a preamble and an error code; and selectively transmitting at least a portion of the packet data from the physical interface onto at least a first of the physical layer links at a second, slower transmission rate, wherein the selectively transmitting step comprises:

dividing the received packet data into a group of separate data segments, and transmitting the group of separate data segments on a group of the physical layer links, respectively, each separate data segment having a separate preamble before each separate data segment and error code, different from the preamble and error code of the received packet data.

7. The method of claim 6, wherein the selectively transmitting step further comprises transmitting an error code for each of said separate data segments on the corresponding physical layer link.

8. The method of transmitting packet data output from a media access controller at first transmission rate, comprising:

establishing a plurality of physical layer links configured for transmitting serial data to a destination network node;

receiving the packet data from the media access controller by a physical interface coupled to the physical layer links, the received packet data having a preamble and an error code; and selectively transmitting at least a portion of the packet data from the physical interface onto at least a first of the physical layer links at a second, slower transmission rate, wherein the selectively transmitting step comprises:

dividing the received packet data into a group of separate data segments, and transmitting the group of separate data segments on a group of the physical layer links, respectively, each separate data segment having a separate preamble before each separate data segment and error code, different from the preamble and error code of the received packet data, and the receiving step comprises:

receiving the packet data at a first transmission rate and the selectively transmitting step comprises:

outputting the group of separate data segments on the respective physical layer links at a second transmission rate, the second transmission rate related to the first transmission rate and the group of the physical layer links.

9. An apparatus for transmitting packet data output from a media access controller, comprising:

an input port configured for receiving the packet data at a first transmission rate, the received packet data having a preamble and an error code; and a data router configured for selectively transmitting at least a portion of the received packet data to at least one of a plurality of physical layer devices at a second transmission rate less than the first transmission rate, wherein the data router is configured to divide the received packet data into separate data segments and output the separate data segments to a group of the physical layer devices, respectively, each separate data segment having a separate preamble before each separate data segment and error code, different from the preamble and error code of the received packet data.

10. The apparatus of claim 9, wherein the data router is configured to split the received packet data based on a prescribed number of bits.

11. The apparatus of claim 10, further comprising at least one elasticity buffer for buffering the at least a portion of the received packet data between the media access controller and the corresponding at least one physical layer link.

* * * * *